United States Patent
Barber et al.

(10) Patent No.: US 9,475,594 B2
(45) Date of Patent: Oct. 25, 2016

(54) LAUNCH LOCK ASSEMBLIES WITH REDUCED PRELOAD AND SPACECRAFT ISOLATION SYSTEMS INCLUDING THE SAME

(71) Applicant: HONEYWELL INTERNATIONAL INC., Morristown, NJ (US)

(72) Inventors: Tim Daniel Barber, Litchfield Park, AZ (US); Ken Young, Peoria, AZ (US); Timothy Hindle, Peoria, AZ (US)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 806 days.

(21) Appl. No.: 13/626,843

(22) Filed: Sep. 25, 2012

(65) Prior Publication Data
US 2014/0084113 A1  Mar. 27, 2014

(51) Int. Cl.
*B64G 1/00* (2006.01)
*B64G 1/64* (2006.01)
*B64G 1/28* (2006.01)
*B64G 1/22* (2006.01)

(52) U.S. Cl.
CPC .............. *B64G 1/641* (2013.01); *B64G 1/283* (2013.01); *B64G 1/285* (2013.01); *B64G 1/286* (2013.01); *B64G 2001/228* (2013.01)

(58) Field of Classification Search
USPC ........ 244/173.3, 173.1, 158, 173.2; 248/614, 248/638, 651, 655, 658, 674; 411/433
See application file for complete search history.

(56) References Cited

U.S. PATENT DOCUMENTS

| | | | |
|---|---|---|---|
| 962,246 A | 6/1910 | Rockwell | |
| 2,000,172 A | 5/1935 | Hanson | |
| 2,766,079 A | 10/1956 | Browne | |
| 3,085,773 A | 4/1963 | Anstrom et al. | |
| 3,182,329 A | 5/1965 | Biesecker | |
| 3,288,421 A | 11/1966 | Peterson | |
| 3,334,563 A | 8/1967 | Armstrong | |
| 3,405,593 A | 10/1968 | Kriesel | |
| 3,441,299 A | 4/1969 | Pfaar | |
| 3,512,162 A | 5/1970 | Charles | |
| 3,525,448 A | 8/1970 | Bauer | |
| 3,577,659 A | 5/1971 | Kail | |
| 3,635,427 A | 1/1972 | Balke | |
| 3,699,580 A | 10/1972 | Joseph et al. | |

(Continued)

OTHER PUBLICATIONS

USPTO Office Action; U.S. Appl. No. 13/289,815, notification date Dec. 21, 2012.

(Continued)

*Primary Examiner* — Terrell McKinnon
*Assistant Examiner* — Michael McDuffie
(74) *Attorney, Agent, or Firm* — Ingrassia Fisher & Lorenz, P.C.

(57) ABSTRACT

Launch lock assemblies with reduced preload are provided. The launch lock assembly comprises first and second mount pieces, a releasable clamp device, and a pair of retracting assemblies. Each retracting assembly comprises a pair of toothed members having interacting toothed surfaces. The releasable clamp device normally maintains the first and second mount pieces in clamped engagement. When the releasable clamp device is actuated, the first and second mount pieces are released from clamped engagement and one toothed member of each retracting assembly moves in an opposite direction relative to the other one toothed member of the other retracting assembly to define an axial gap on each side of the first mount piece.

16 Claims, 13 Drawing Sheets

(56) References Cited

U.S. PATENT DOCUMENTS

| | | |
|---|---|---|
| 3,794,277 A | 2/1974 | Smedley |
| 3,981,467 A * | 9/1976 | Ludlow .................... 244/173.1 |
| 3,983,965 A | 10/1976 | Wright, Jr. |
| 4,054,186 A | 10/1977 | Banks, Jr. et al. |
| 4,185,720 A | 1/1980 | Wright, Jr. et al. |
| 4,243,192 A | 1/1981 | Johnson |
| 4,360,284 A | 11/1982 | Brandenburg |
| 4,429,862 A | 2/1984 | Niedecker |
| 4,515,336 A | 5/1985 | Fischer |
| 5,028,180 A | 7/1991 | Sheldon |
| 5,040,748 A | 8/1991 | Torre et al. |
| 5,060,888 A | 10/1991 | Vezain et al. |
| 5,069,571 A | 12/1991 | Matczak et al. |
| 5,160,233 A | 11/1992 | McKinnis |
| 5,190,423 A | 3/1993 | Ewing |
| 5,199,690 A | 4/1993 | Marshall |
| 5,209,596 A | 5/1993 | Matczak et al. |
| 5,511,979 A | 4/1996 | Perfect |
| 5,620,154 A | 4/1997 | Hey |
| 5,722,709 A | 3/1998 | Lortz et al. |
| 6,126,115 A | 10/2000 | Carrier et al. |
| 6,135,401 A | 10/2000 | Chen |
| 6,330,995 B1 | 12/2001 | Mangeiga et al. |
| 6,350,074 B1 | 2/2002 | Borges et al. |
| 6,352,397 B1 | 3/2002 | O'Quinn et al. |
| 6,364,564 B1 | 4/2002 | Chaniot |
| 6,467,987 B1 | 10/2002 | Larsen et al. |
| 6,508,437 B1 | 1/2003 | Davis et al. |
| 6,661,331 B2 | 12/2003 | Valembois et al. |
| 6,669,393 B2 | 12/2003 | Schilling |
| 6,760,211 B2 | 7/2004 | Bueno Ruiz et al. |
| 6,769,830 B1 | 8/2004 | Nygren |
| 6,843,449 B1 | 1/2005 | Manteiga et al. |
| 7,001,127 B2 * | 2/2006 | Tuszynski .................... 411/433 |
| 7,614,582 B2 | 11/2009 | Hafner |
| 7,674,063 B2 | 3/2010 | Jan et al. |
| 7,677,522 B2 | 3/2010 | Bakos |
| 7,753,612 B2 | 7/2010 | Bouru et al. |
| 7,878,448 B2 | 2/2011 | Olsen et al. |
| 8,371,534 B1 | 2/2013 | Goodzeit et al. |
| 8,956,068 B2 | 2/2015 | Mekid |
| 2005/0269445 A1 | 12/2005 | Chevalier et al. |
| 2008/0228332 A1 | 9/2008 | Hindle et al. |
| 2009/0020381 A1 | 1/2009 | Hindle et al. |
| 2009/0121399 A1 | 5/2009 | Hindle et al. |
| 2009/0243169 A1 | 10/2009 | Hadden et al. |
| 2010/0101903 A1 | 4/2010 | Boyd et al. |
| 2010/0320358 A1 * | 12/2010 | Boyd et al. .................... 248/636 |
| 2011/0036960 A1 | 2/2011 | Li |
| 2012/0012711 A1 | 1/2012 | Ross et al. |
| 2012/0104177 A1 | 5/2012 | Choi et al. |
| 2012/0112010 A1 | 5/2012 | Young et al. |
| 2012/0320358 A1 | 12/2012 | Ruoff |
| 2013/0221163 A1 | 8/2013 | Barber et al. |

OTHER PUBLICATIONS

USPTO Office Action for U.S. Appl. No. 13/289,815 dated May 21, 2013.

USPTO Office Action for U.S. Appl. No. 13/289,815 dated Sep. 18, 2013.

USPTO Office Action for U.S. Appl. No. 13/406,647 dated Sep. 19, 2013.

USPTO Final Office Action, Notification Date Jul. 21, 2014; U.S. Appl. No. 13/289,815.

Barber, T. D. et al.: "Launch Lock Assemblies Including Axial Gap Amplification Devices and Spacecraft Isolation Systems Including the Same" filed with USPTO on Feb. 28, 2012 and assigned U.S. Appl. No. 13/406,647.

Young, K. et al.: "Mounting Systems for Structural Members, Fastening Assemblies Thereof, and Vibration Isolation Systems Including the Same" filed with the USPTO on Nov. 4, 2011 and assigned U.S. Appl. No. 13/289,815.

USPTO Office Action for U.S. Appl. No. 13/289,815 Notification Date May 8, 2015.

USPTO Office Action for U.S. Appl. No. 13/289,815 Notification Date Sep. 25, 2015.

USPTO Notice of Allowance for U.S. Appl. No. 13/406,647 dated Dec. 13, 2013.

USPTO Notice of Allowance and Fee(s) Due for U.S. Appl. No. 13/289,815 dated Apr. 11, 2016.

* cited by examiner

LAUNCH LOCK ASSEMBLIES WITH REDUCED PRELOAD AND SPACECRAFT ISOLATION SYSTEMS INCLUDING THE SAME

STATEMENT REGARDING FEDERALLY SPONSORED RESEARCH OR DEVELOPMENT

This invention was made with Government support under NNG09HR00C awarded by NASA. The Government has certain rights in this invention.

TECHNICAL FIELD

The present invention relates generally to spacecraft isolation systems and, more particularly, to launch lock assemblies with reduced preload and spacecraft isolation systems including the same.

BACKGROUND

Control moment gyroscope arrays, reaction wheel arrays, and other such devices deployed onboard spacecraft for attitude adjustment purposes generate vibratory forces during operation. Spacecraft isolation systems are commonly employed to minimize the transmission of vibratory forces emitted from such attitude adjustment devices, through the spacecraft body, to any vibration-sensitive components (e.g., optical payloads) carried by the spacecraft. Spacecraft isolation systems commonly include a number of individual vibration isolators (typically three to eight isolators), which are positioned between the spacecraft payload and the spacecraft body in a multi-point mounting arrangement.

Spacecraft isolation systems are often also equipped with launch lock assemblies that are positioned between the spacecraft and the payload support structure in parallel with the isolators. During spacecraft launch, the launch lock assemblies maintain the payload support structure in a fixed spatial relationship with the spacecraft. In so doing, the launch lock assemblies shunt significant inertial or shock loads generated during spacecraft launch around the isolators to protect the isolators from damage that might otherwise occur. At a desired juncture after launch, the launch lock assemblies are actuated to allow relative movement between the payload support structure and the spacecraft. For example, in an implementation wherein the spacecraft isolation system includes a number of single DOF, three parameter isolators of the type described above, the isolators may be maintained in a compressed state by the launch lock assemblies prior to launch. The isolators are preloaded in their compressed stage and biased toward design or free length positions. When the launch lock assemblies are actuated as hereinafter described, the isolators expand axially into the design position and displace the payload support structure outward from the spacecraft body. The payload support structure, supported by or "floating on" the isolators, is now able to move relative to the spacecraft and the isolators function collectively to dampen vibrations transmitted between the payload support structure and the spacecraft body.

Each launch lock assembly includes first and second mount pieces that are affixed to the payload support structure and to the spacecraft, respectively. In a bolt-stretch type of launch lock assembly, for example, a specialized bolt normally maintains the first and second mount pieces in clamped engagement. Upon launch lock assembly actuation, an actuator stretches the bolt to increase its axial length without snapping or fracturing the bolt, releasing the first and second mount pieces from clamped engagement, thereby creating an axial gap therebetween and enabling the isolators to expand axially into the design position as noted above. Launch lock assemblies, including such bolt-stretch launch lock assemblies and other types of releasable clamping mechanisms, may include at least one axial gap amplification device as described in co-pending application Ser. No. 13/406,647 entitled "Launch Lock Assemblies including Axial Gap Amplification Devices and Spacecraft Isolation Systems Including the Same" filed Feb. 28, 2012 by Honeywell International Inc., the assignee of the instant application, to increase the length of the axial gap created between the first and second mount pieces beyond that directly attributable to stretching of the bolt or other axially-stretchable member. It is generally desirable to maximize the axial length of gaps to provide isolators with a sufficient range of motion to optimize the damping performance of the multi-point isolation system. The axial gap created is on one side of the first mount piece only (i.e., a one-sided gap). Preload, provided by the isolators, moves the first mount piece into the center of the one-sided gap, providing necessary axial clearance on both sides of the first mount piece. Effecting movement of the first mount piece into the one-sided gap upon launch lock assembly actuation makes preload requirements higher. Therefore, the increase in length of the axial gap provided by the axial gap amplification device is limited by the preload that can be applied thereto.

Accordingly, it is desirable to provide a launch lock assembly with reduced preload and a spacecraft isolation system including the same. It is also desired to provide a launch lock assembly with reduced preload to increase the length of the axial gap created between the first and second mount pieces beyond that directly attributable to stretching of the bolt or other axially-stretchable member, without the increase in length being limited by preload forces. Furthermore, other desirable features and characteristics of the present invention will become apparent from the subsequent detailed description of the present invention and the appended claims, taken in conjunction with the accompanying drawings and this Background of the invention.

BRIEF SUMMARY

Launch lock assemblies with reduced preload are provided. In accordance with one exemplary embodiment, the launch lock assembly comprises first and second mount pieces, a releasable clamp device, and a pair of retracting assemblies. The releasable clamp device normally maintains the first and second mount pieces in clamped engagement and, when actuated, releases the first and second mount pieces from clamped engagement. Each retracting assembly comprises a pair of toothed members having interacting toothed surfaces. One toothed member of each retracting assembly is adapted to move in an opposite direction relative to the other one toothed member of the other retracting assembly to define an axial gap on each side of the first mount piece when the releasable clamp device is actuated.

Launch lock assemblies with reduced preload are provided in accordance with yet another exemplary embodiment of the present invention. The launch lock assembly comprises first and second mount pieces, a pair of retracting assemblies, and a releasable clamp device. Each retracting assembly comprises a first contrate ring and a second contrate ring adjacent the first contrate ring. The second contrate ring of each retracting assembly normally resides in an axially-expanded position wherein the teeth of the second contrate ring are in tip-to-tip engagement with the teeth of the first contrate ring of the same retracting assembly. The second contrate ring of each retracting assembly is biased toward an axially-collapsed position wherein the teeth of the second contrate ring are in tip-to-root engagement with the teeth of the first contrate ring of the same retracting assembly to decrease the axial length of each respective retracting assembly. The releasable clamp device normally maintains the first and second mount pieces in clamped engagement and, when actuated, releases the first and second mount pieces from clamped engagement to allow movement of the second contrate ring of each retracting assembly into the axially-collapsed position to form an axial gap on each side of the first mount piece.

Spacecraft isolation systems for deployment between a spacecraft and a payload are provided in accordance with yet another exemplary embodiment of the present invention. The spacecraft isolation system comprises a plurality of isolators disposed between the spacecraft and the payload in a multi-point arrangement and at least one launch lock assembly coupled between the spacecraft and the payload in parallel with the plurality of isolators. The launch lock assembly comprises first and second mount pieces, a releasable clamp device, and a pair of retracting assemblies. The releasable clamp device normally maintains the first and second mount pieces in clamped engagement and, when actuated, releases the first and second mount pieces from clamped engagement. Each retracting assembly comprises a pair of toothed members having interacting toothed surfaces. One toothed member of each retracting assembly is adapted to move in an opposite direction relative to the other one toothed member of the other retracting assembly to define an axial gap on each side of the first mount piece when the releasable clamp device is actuated.

BRIEF DESCRIPTION OF THE DRAWINGS

At least one example of the present invention will hereinafter be described in conjunction with the following figures, wherein like numerals denote like elements, and.

DETAILED DESCRIPTION

The following Detailed Description is merely exemplary in nature and is not intended to limit the invention or the application and uses of the invention. Furthermore, there is no intention to be bound by any theory presented in the preceding Background or the following Detailed Description.

Figure 1:
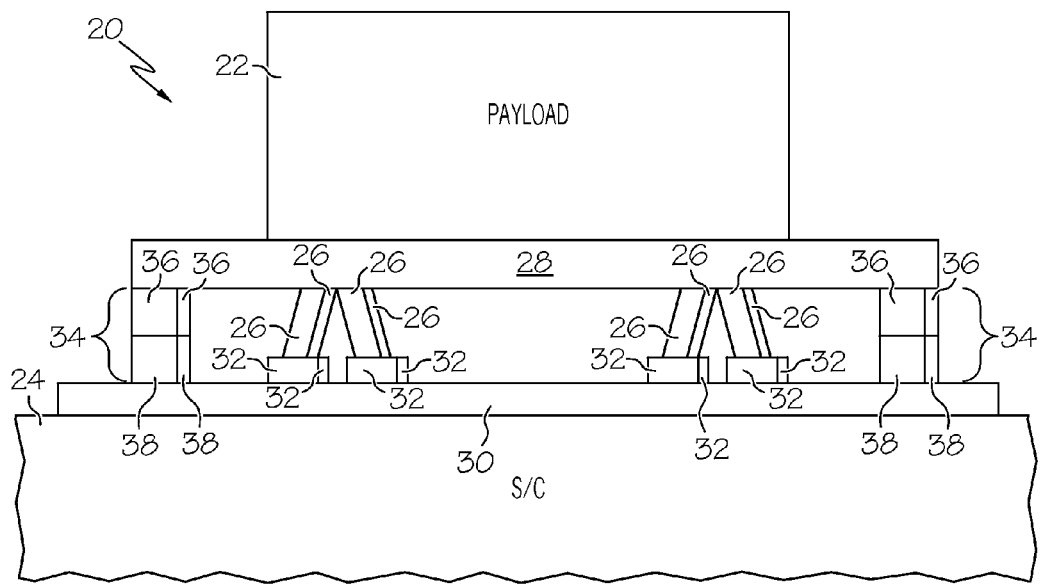
FIGS. 1 and 2 are simplified schematics of an exemplary spacecraft isolation system including a number of launch lock assemblies in locked (pre-launch) and unlocked (isolated) positions, respectively, as illustrated in accordance with an exemplary embodiment of the present invention.
Figure 2:
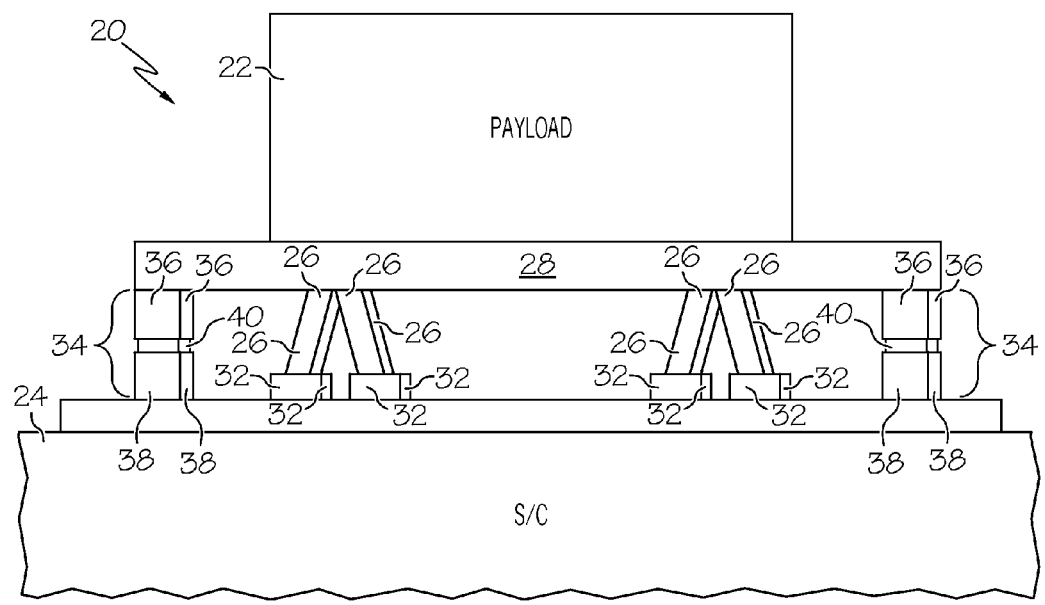

FIGS. 1 and 2 are simplified schematics of a spacecraft isolation system 20 in locked (pre-launch) and unlocked (design, isolated) positions, respectively, as illustrated in accordance with an exemplary embodiment of the present invention. When in the unlocked position shown in FIG. 2, spacecraft isolation system 20 reduces the transmission of vibrations between a payload 22 and a host spacecraft 24. In the illustrated example, isolation system 20 includes a plurality of single degree of freedom or axially-damping vibration isolators 26, which are mechanically coupled to and collectively support payload 22. More specifically, vibration isolations 26 may be pivotally coupled to a payload support structure 28, which supports the component or components included within payload 22. The opposing ends of isolators 26 are mounted to a spacecraft mounting interface 30 utilizing a plurality of mounting brackets 32, which may provide a pivot-type connection. In this particular example, isolation system 20 includes eight vibration isolators 26, which are positioned in an octopod mounting arrangement to provide high fidelity damping in six degrees of freedom. However, in further embodiments, isolation system 20 may include a lesser number or a greater number of isolators, which may be positioned in other mounting arrangements. For example, in an alternative embodiment, isolation system 20 may include six vibration isolators 26 positioned in a hexapod or Stewart platform-type mounting arrangement. Isolators 26 are preferably, although not necessarily, three parameter isolators. Spacecraft isolation systems employing three parameter isolators, which behave mechanically as a primary spring in parallel with a series-coupled secondary spring and damper, provide superior attenuation of high frequency vibratory forces (commonly referred to as "jitter") as compared to spacecraft isolation systems employing other types of passive isolators (e.g., viscoelastic isolators). The three parameter isolators are advantageously implemented as single degree of freedom ("DOF") devices, which provide damping along a single longitudinal axis. An example of a single DOF, three parameter isolator is the D-STRUT® isolator developed and commercially marketed by Honeywell, Inc., currently headquartered in Morristown, N.J.

Payload 22 may include one more vibration-sensitive components, such as an optical payload or sensor suite, and isolation system 20 may serve to minimize the transmission of vibrations from a vibration-emitting source or sources aboard spacecraft 24, through spacecraft mounting interface 30, through payload support structure 28, and to payload 22. In such cases, payload support structure 28 may assume the form of an optical bench fabricated from a lightweight, high strength material, such as carbon fiber. In other embodiments, payload 22 may include one or more vibration-emitting devices, and isolation system 20 may serve to reduce the transmission of vibrations from payload 22 to spacecraft 24 and any vibration-sensitive components deployed thereon; e.g., payload 22 may include one or more rotational devices utilized in the attitude adjustment of spacecraft 24, such as one or more reaction wheels or control moment gyroscopes. For example, in one embodiment, payload 22 assumes the form of a reaction wheel array including a number of reaction wheels, and payload support structure 28 assumes the form of a support platform to which the reaction wheels are mounted in a circumferentially-spaced array.

In addition to isolators 26 and their associated mounting hardware, spacecraft isolation system 20 further includes a number of launch lock assemblies 34, which are mechanically or kinetically coupled between payload support structure 28 and spacecraft mounting interface 30 in parallel with isolators 26. As indicated in FIGS. 1 and 2, isolation system 20 may include four launch lock assemblies 34, which are circumferentially spaced about an outer portion of payload support structure 28; e.g., in an embodiment wherein payload support structure 28 has a generally rectangular planform shape, launch lock assemblies 34 may be positioned at or near the four corners of structure 28. It will be understood, however, that the number and positioning of launch lock assemblies 34 will inevitably vary among different embodiments and that launch lock assemblies 34 will typically be spaced so as to provide a desired natural frequency of the payload when in the locked configuration. Launch lock assemblies 34 are generically illustrated in FIGS. 1 and 2 as each including a first mount piece 36 (also referred to as a "top mount") and a second mount piece 38 (also referred to as a "base"). As noted previously, when mount pieces 36 and 38 are in clamped engagement, as illustrated in FIG. 1, launch lock assemblies 34 fix or lock the spatial position of payload support structure 28 and payload 22 relative to spacecraft 24. Thus, in the locked position (FIG. 1), launch lock assemblies 34 provide rigid and structurally-robust force transmission paths for effectively shunting shock loads around isolators 26 to protect isolators 26 from damage during spacecraft launch.

At a desired time of deployment occurring subsequent to spacecraft launch, launch lock assemblies 34 are actuated to release mount pieces 36 and 38 from clamped engagement, creating an axial gap between the mount pieces. The isolators 26 are able to compress and expand in conjunction with relative movement between payload support structure 28 (or, more generally, payload 22) and spacecraft 24. An example of a launch lock assembly with reduced preload suitable for usage as one or all of launch lock assemblies 34 is described in detail below in conjunction with FIGS. 3-16.

Figure 3:
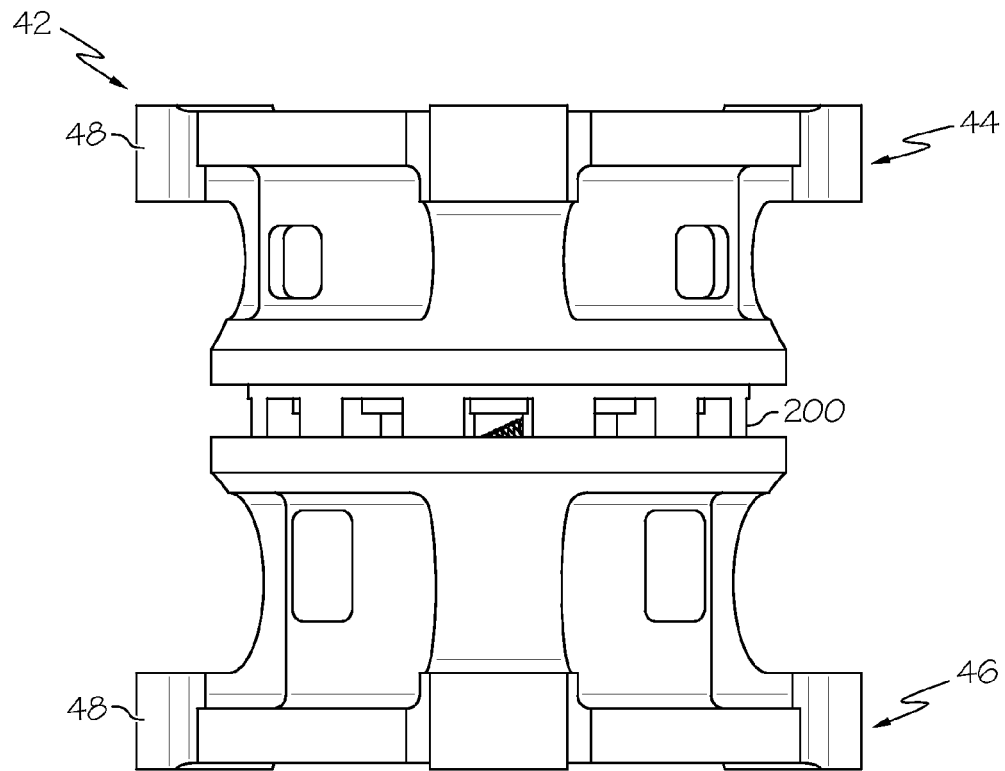
FIGS. 3 and 4 are side and top views, respectively, of a launch lock assembly in a locked position, suitable for usage as one or all of the launch lock assemblies shown in FIGS. 1 and 2, and illustrated in accordance with an exemplary, non-limiting embodiment of the present invention.
Figure 4:
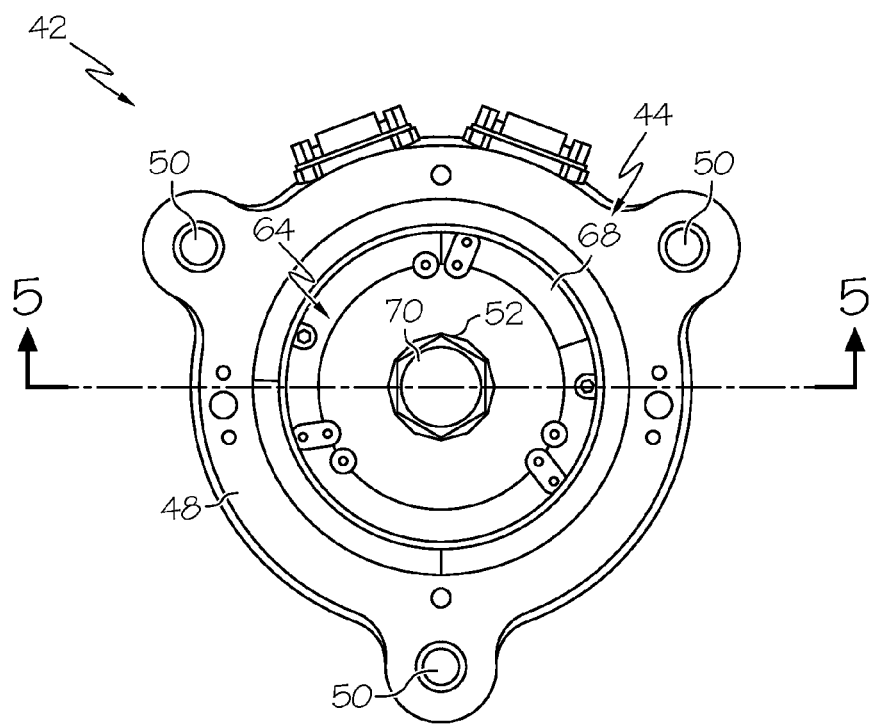
Figure 5:
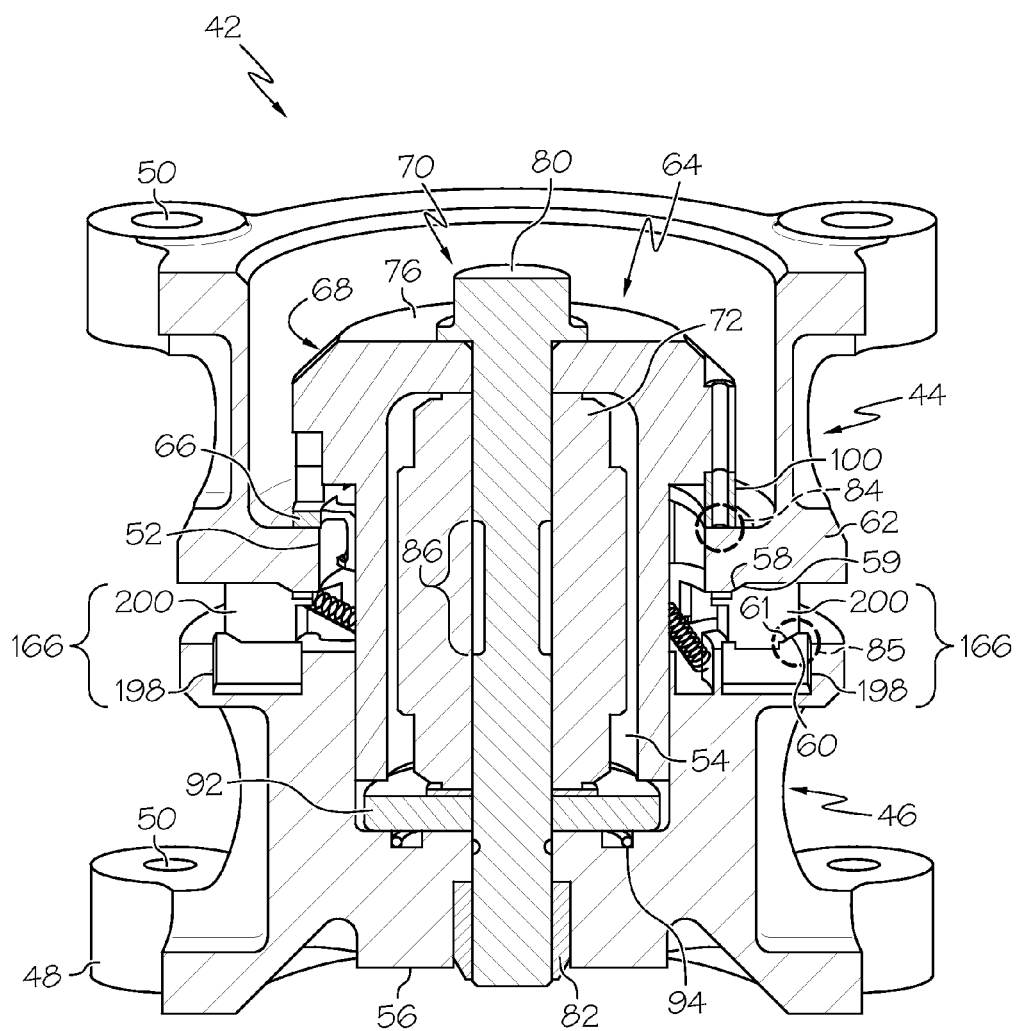
FIG. 5 is a cross-sectional view of the launch lock assembly shown in FIGS. 3 and 4 and taken along line 5-5 identified in FIG. 4, the launch lock assembly including a first and a second mount piece.

FIGS. 3 and 4 are side and top views, respectively, of a launch lock assembly 42 in a locked position and illustrated in accordance with an exemplary, non-limiting embodiment of the present invention. FIG. 5 is a cross-sectional view of launch lock assembly 42, as taken along line 5-5 identified in FIG. 4. For convenience of explanation, terms of direction will be utilized in the following description, such as "upper," "lower," and the like, corresponding to the orientation of launch lock assembly shown in the figures. It should be understood, however, that the orientation of launch lock assembly 42 can be varied in three dimensional space and thus is largely arbitrary.

Referring to FIGS. 3 and 5, launch lock assembly 42 includes an upper mount piece 44 (also referred to herein as a "first mount piece") and a lower mount piece 46 (also referred to herein as a "second mount piece"). When installed within a multi-point isolation system such as spacecraft isolation system 20 (FIGS. 1 and 2), a first end of launch lock assembly 42 is directly or indirectly attached to a payload and a second, opposing end of launch lock assembly 42 is directly or indirectly attached to the spacecraft body. For example, the outer end of upper mount piece 44 (i.e., the upper end of mount piece 44 in FIGS. 3 and 5) may be attached to payload support structure 28 shown in FIGS. 1 and 2, while the outer end of lower mount piece 46 (i.e., the lower end of mount piece 46 in FIGS. 3 and 5) is attached to spacecraft mounting interface 30 shown in FIGS. 1 and 2. Conversely, the outer end of mount piece 44 may be attached to spacecraft mounting interface 30 (FIGS. 1 and 2), while the outer end of mount piece 46 is attached to payload support structure 28 (FIGS. 1 and 2). To facilitate attachment utilizing a plurality of bolts or other such fasteners (not shown), the outer ends of mount pieces 44 and 46 may each be fabricated to include a circumferential flange 48 having a plurality of fastener openings 50 therein.

In the illustrated example, and as may be appreciated most easily by referring to FIG. 5, mount pieces 44 and 46 each have a substantially tubular or annular geometry. Upper mount piece 44, specifically, has a generally tubular body through which a generally cylindrical inner bore or cavity 52 extends. Inner cavity 52 extends entirely through mount piece 44 such that the opposing ends of mount piece 44 are both open. The tubular body of lower mount piece 46 likewise defines a generally cylindrical inner bore or cavity 54; however, inner cavity 54 does not extend entirely through lower mount piece 46 and is instead enclosed by a lower terminal endwall 56 provided near the mounting flange 48 of mount piece 46. Thus, generally stated, lower mount piece 46 has an open upper end and a closed lower end. Stated differently, the open lower end of upper mount piece 44 and the open upper end of lower mount piece 46 collectively define a central cavity within launch lock assembly 42 that houses the various other components of launch lock assembly 42 (described below). Mount pieces 44 and 46 are each preferably fabricated as a single, machined component from a lightweight metal or alloy, such as an aluminum-based alloy. This example notwithstanding, mount pieces 44 and 46 may be formed from various other materials and may each be assembled from multiple, discrete structural components in alternative embodiments. In addition, the dimensions and geometry of upper and lower mount pieces 44 and 46 may vary, and mount pieces 44 and 46 may not house all or any of the other components included within launch lock assemblies 42 in alternative embodiments.

Still referring to FIG. 5, mount pieces 44 and 46 are positioned in a co-axial arrangement such that cavities 52 and 54 are aligned in an axial direction; that is, as taken along the longitudinal axis of launch lock assembly 42. When the launch lock assembly 42 is in the locked position shown in FIGS. 3 and 5, mount pieces 44 and 46 are separated by a contrate ring 200, as hereinafter described. The upper mount piece 44 includes a contact surface 58 defined, at least in part, by an inner annular protrusion 62 provided around the interior of lower end portion of upper mount piece 44 and within internal cavity 52. The lower mount piece 46 (more specifically contrate ring 198) includes a contact surface 60 defined by a raised annular rim 45 (shown best in FIGS. 9 and 11A) provided around and extending axially from the upper end portion of lower mount piece toward upper mount piece, for purposes as hereinafter described. As hereinafter described, the upper end portion of lower mount piece 46 comprises contrate ring 198.

Figure 9:
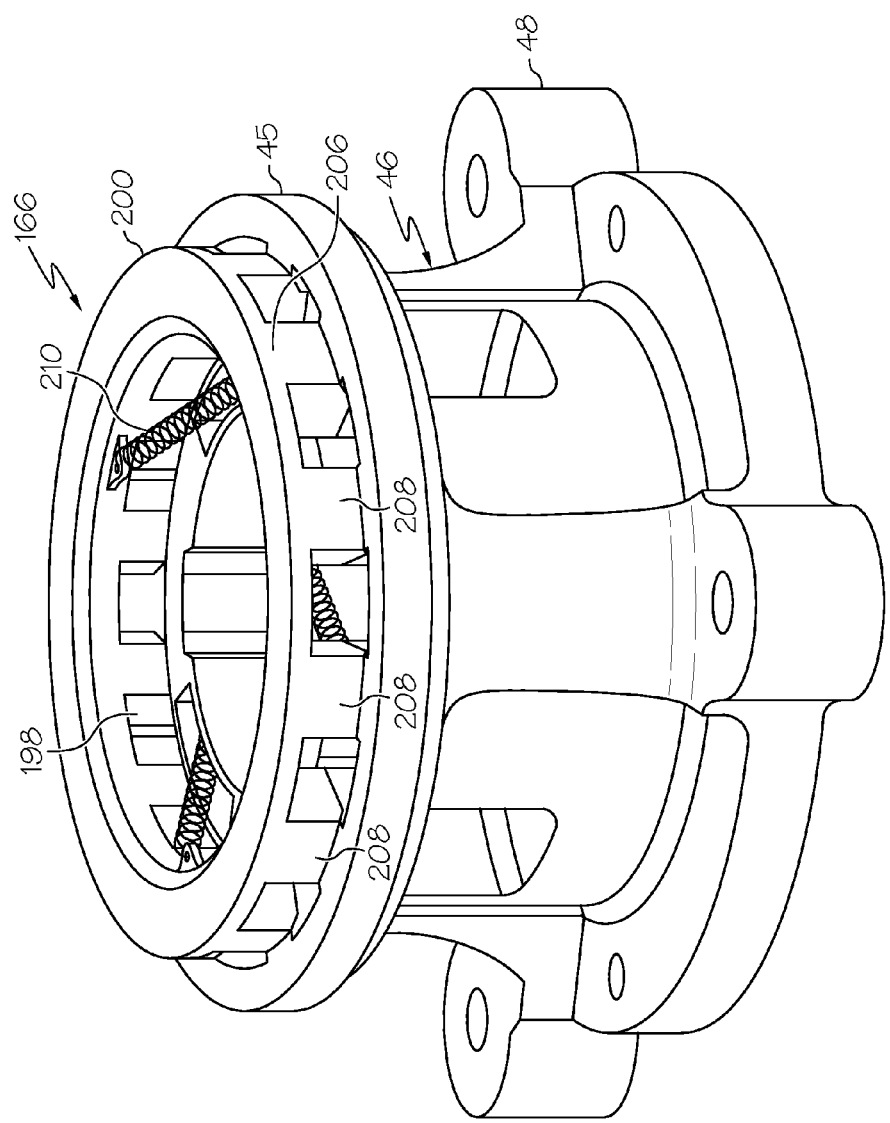
FIG. 9 is an isometric view of a second, lower retracting assembly and the second mount piece that may be included within the exemplary launch lock assembly shown in FIGS. 3-5.
Figure 10:
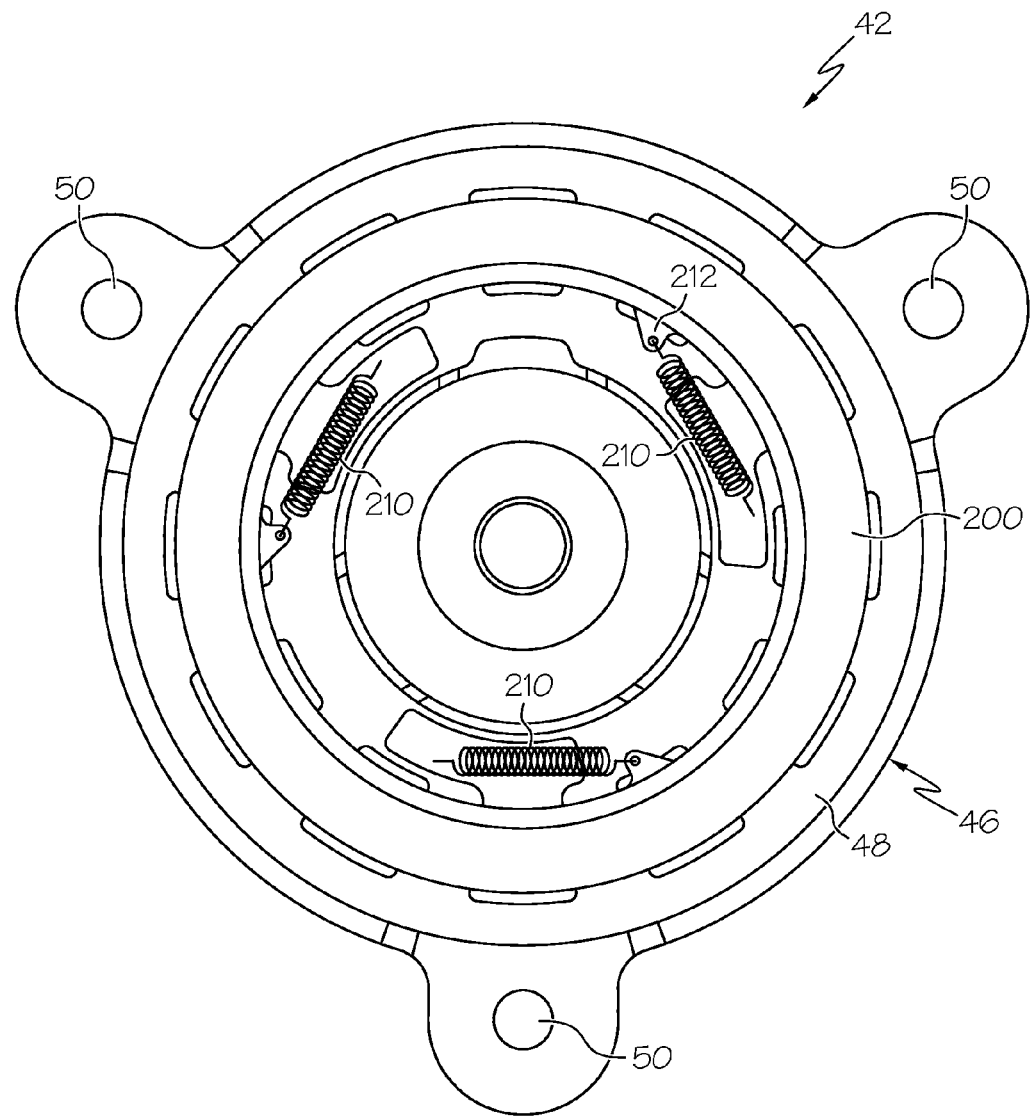
FIG. 10 is a top view of the second, lower retracting assembly shown in FIG. 9.

In addition to mount pieces 44 and 46, launch lock assembly 42 further includes a releasable clamp device 64 (shown in FIGS. 5 and 6) and a pair of retracting assemblies 66 (FIGS. 5 and 6) and 166 (FIGS. 5, and 9-10). The first, upper retracting assembly 66 of the pair of retracting assemblies comprises first and second contrate rings 98 and 100. The second, lower retracting assembly 166 comprises first and second contrate rings 198 and 200 (again, the terms "upper" and "lower" utilized in a non-limiting sense as a convenient means of describing the exemplary embodiments illustrated by the accompanying drawings). Releasable clamp device 64 can assume any form and may include any number of components suitable for maintaining mount pieces 44 and 46 in clamped engagement until a desired time of deployment. Releasable clamp device 64 is ideally relatively lightweight, compact, and reliable. Releasable clamp device 64 generates little to no shock forces upon actuation. To this end, and by way of non-limiting example, releasable clamp device 64 may include at least three main components: (i) a sliding clamp member 68 (shown in FIGS. 4-6); (ii) an axially-stretchable structural element or elements, such as an axially-stretchable bolt 70 (shown in FIGS. 4-5 and 12); and (iii) an actuator suitable for stretching the axially-stretchable structural element in a controlled manner at the desired time of deployment, such as bolt-stretch actuator 72 (shown in FIG. 13). Each of these components is described, in turn, below.

Figure 6:
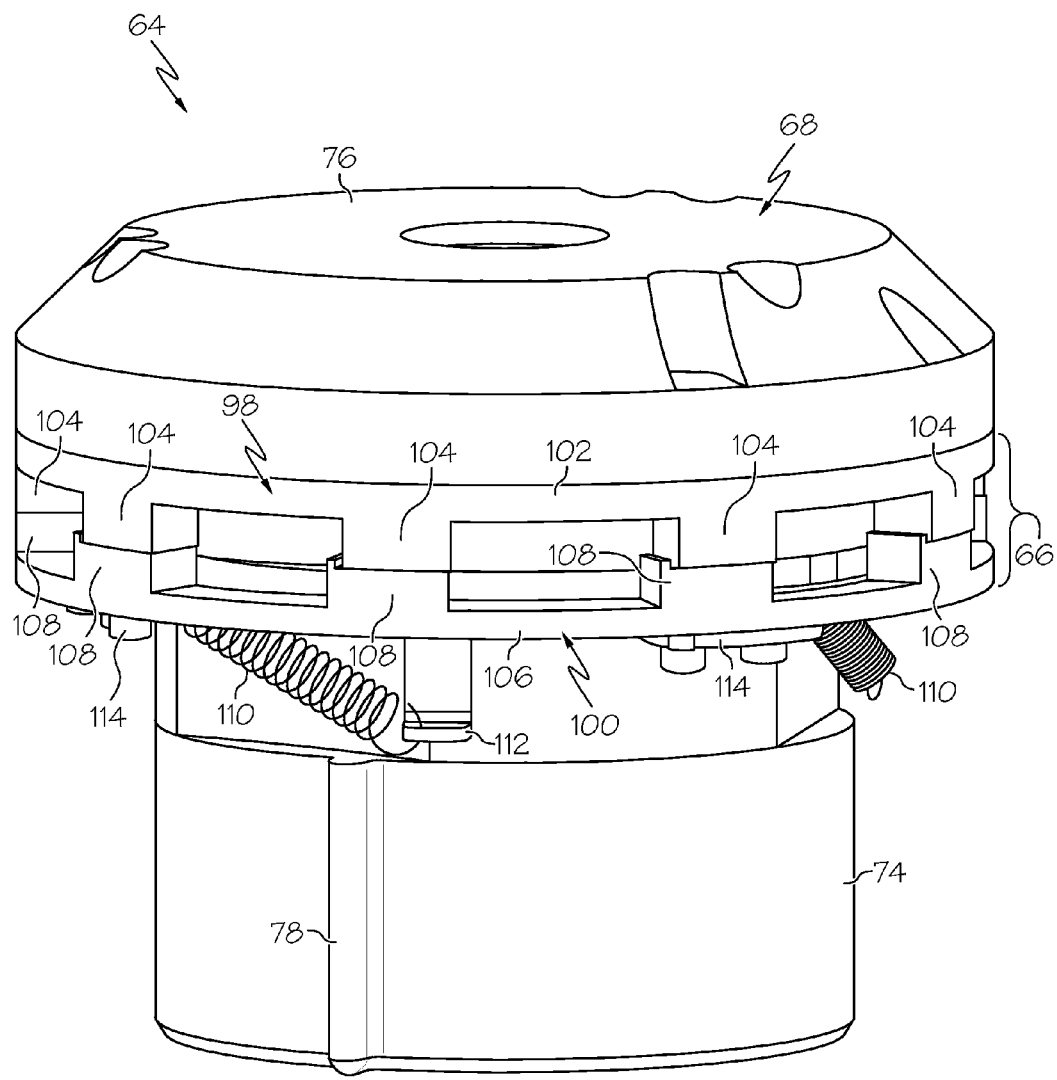
FIG. 6 is an isometric view of a releasable clamp device and a first, upper retracting assembly that may be included within the exemplary launch lock assembly shown in FIGS. 3-5.

FIG. 6 is an isometric view of releasable clamp device 64 and the first, upper retracting assembly 66 illustrating sliding clamp member 68 in greater detail. Referring jointly to FIGS. 5 and 6, sliding clamp member 68 includes an elongated, tubular body 74 and a radially-enlarged, cylindrical head or cap 76. Cylindrical cap 76 is affixed to the upper end of tubular body 74 and may be integrally formed therewith as a single machined piece. Tubular body 74 extends axially from cap 76 in a downward direction, toward lower mount piece 46, and into cavity 54. Tubular body 74 is able to slide axially within cavity 54 such that clamp member 68 can slide axially with respect to lower mount piece 46. Tubular body 74 is advantageously fabricated to have an outer diameter and geometry substantially conformal to the inner diameter and geometry of cavity 54, respectively, to guide the sliding movement of sliding clamp member 68. Rotation of tubular body 74 relative to lower mount piece 46, and thus rotation of sliding clamp member 68 relative to lower mount piece 46, is prevented by one or more anti-rotation features. For example, as shown in FIG. 6, tubular body 74 may be fabricated to include a key 78, which travels within a mating longitudinal keyway (not shown) formed within the inner annular surface bounding cavity 54 when clamp member 68 slides axially relative to lower mount piece 46.

Referring again to FIGS. 5 and 12, axially-stretchable bolt 70 extends through axially-aligning openings provided through cap 76 of sliding clamp member 68 and through terminal endwall 56 of lower mount piece 46. Axially-stretchable bolt 70 extends along an axis substantially parallel to and, preferably, substantially co-linear with the longitudinal axis of launch lock assembly 42. The upper end of axially-stretchable bolt 70 terminates in a radially-enlarged head 80, which abuts the upper surface of cap 76 proximate the central opening provided therein. A nut 82 is threaded onto the lower end of bolt 70 and may be received within a cylindrical counter-bore provided within terminal endwall 56, as generally shown in FIG. 5.

Axially-stretchable bolt 70 is selected to have a sufficient tensile strength to maintain mount pieces 44 and 46 in clamped engagement in the event of significant shock loads and other disturbances forces generated during spacecraft launch or transport. Axially-stretchable bolt 70 is also designed to yield when subjected to a predetermined tensile force such that bolt 70 stretches to provide a desired increase in length without snapping or fracturing. The tensile strength of bolt 70 may controlled by varying the outer diameter of the bolt shank and the material from which bolt 70 is fabricated. In one embodiment, and by way of non-limiting example, bolt 70 is fabricated from a steel alloy, such as A286. Additionally, the tensile strength of bolt 70 may be fine-tuned by removing material from around a mid-portion of the bolt shank to decrease the outer diameter thereof in a controlled manner (commonly referred to as "necking"). The resulting structure, wherein bolt 70 has a reduced outer diameter or "stepped-down" intermediate portion, is shown in FIG. 5 at 86. Axially-stretchable bolt 70 is further illustrated in FIG. 12.

Various different devices can be utilized as bolt-stretch actuator 72, providing that such devices can be reliably actuated at the desired time of deployment to stretch bolt 70 and release mount pieces 44 and 46 from clamped engagement in the manner described below. It is generally preferred, however, that bolt-stretch actuator 72 is able to provide a relatively high output force in a small, lightweight package. For at least this reason, bolt-stretch actuator 72 may be a shape memory alloy ("SMA") device. In the exemplary embodiment illustrated in FIGS. 3-5, and as illustrated in greater detail in FIG. 13, bolt-stretch actuator 72 includes a SMA core 88 (identified in FIG. 13) and a circuit heater 90, which circumscribes or is wrapped around SMA core 88. SMA core 88 may be fabricated from Nitinol® or another known shape memory alloy. SMA core 88 has generally tubular body through which a central channel or bore extends. SMA core 88 is disposed around axially-stretchable bolt 70, which passes through the longitudinal channel of core 88. To optimize the efficiency with which SMA core 88 is heated, SMA core 88 and circuit heater 90 may be encapsulated in thermal insulation. In addition, as shown in FIG. 5, a thermally-insulating washer 92 may be disposed between terminal endwall 56 of lower mount piece 46 and bolt-stretch actuator 72.

Prior to actuation, SMA core 88 resides in an axially-compressed state. Upon heating to a predetermined transition temperature by heater 90, SMA core 88 expands in an axial direction to exert an expansion force on axially-stretchable bolt 70 through sliding clamp member 68. The output force of bolt-stretch actuator 72 is sufficient to stretch bolt 70 and increase the length thereof by a predetermined amount; e.g., as a non-limiting example, SMA core 88 may stretch bolt 70 by about 0.054 inch when actuated. Circuit heater 90 may be energized at the desired time of actuation by a controller (not shown) electrically connected to heater 90 by wired connection extending through a window provided in the annular sidewall of lower mount piece 46 (shown in FIG. 3). A resilient element, such as a wave spring 94 (FIG. 5), is further provided within cavity 54 and compressed between insulating washer 92 and terminal endwall 56 to retain bolt-stretch actuator 72 against cap 76 of sliding clamp member 68 after heating and subsequent cooling and axial contraction of SMA core 88.

The pair of retracting assemblies 66 and 166 will now be described in conjunction with the exemplary embodiment of launch lock assembly 42 shown in FIGS. 3-16. The pair of retracting assemblies is especially well-suited for use in conjunction with a bolt-stretch clamping device of the type described above; however, embodiments of the pair of retracting assemblies may also be utilized with other types of releasable clamp devices, as well. As noted previously, the pair of retracting assemblies comprises a first, upper retracting assembly 66 and a second, lower retracting assembly 166 (again, the terms "upper" and "lower" utilized in a non-limiting sense as a convenient means of describing the exemplary embodiment illustrated by the accompanying drawings). Each of the retracting assemblies 66 and 166 includes a pair of two toothed or castellated sliding members (e.g., contrate rings), which normally reside in an axially-expanded position, which are biased toward an axially-collapsed position, and which are preloaded to maintain the sliding members in the axially-expanded position until actuation of the releasable clamp device. The term "contrate ring" or "toothed member" as used herein, denotes a generally annular structure having a plurality of teeth, castellations, or like projections that extend from the body of the annular structure in a generally axial direction.

As noted above, and best illustrated in FIGS. 5 and 6, the first, upper retracting assembly 66 comprises a first pair of contrate rings. The first pair of contrate rings comprises the first contrate ring 98 and the second contrate ring 100 having interacting toothed surfaces. As shown in FIG. 6, the first contrate ring 98 of retracting assembly 66 may include an annular body 102 from which a plurality of block-shaped teeth 104 extend in an axial direction and toward the second contrate ring 100. Contrate ring 100 may likewise include an annular body 106 from which a plurality of block-shaped teeth 108 extend in an axial direction and toward first contrate ring 98. Contrate rings 98 and 100 each extend around the releasable clamp device 64, and specifically around the tubular body 74 of sliding clamp member 68. The annular body 102 of the first contrate ring 98 may be integrally formed with cap 76 of sliding clamp member 68 as a single, unitary part, such as shown in FIG. 5. Alternatively, annular body of first contrate ring 98 and cap 76 may be separate, as illustrated in FIG. 6. Annular body 102 of contrate ring 98 may be attached to cap 76 of sliding clamp member 68 utilizing a plurality of fasteners (not shown), welded or soldered thereto, or otherwise affixed thereto.

Figure 7:
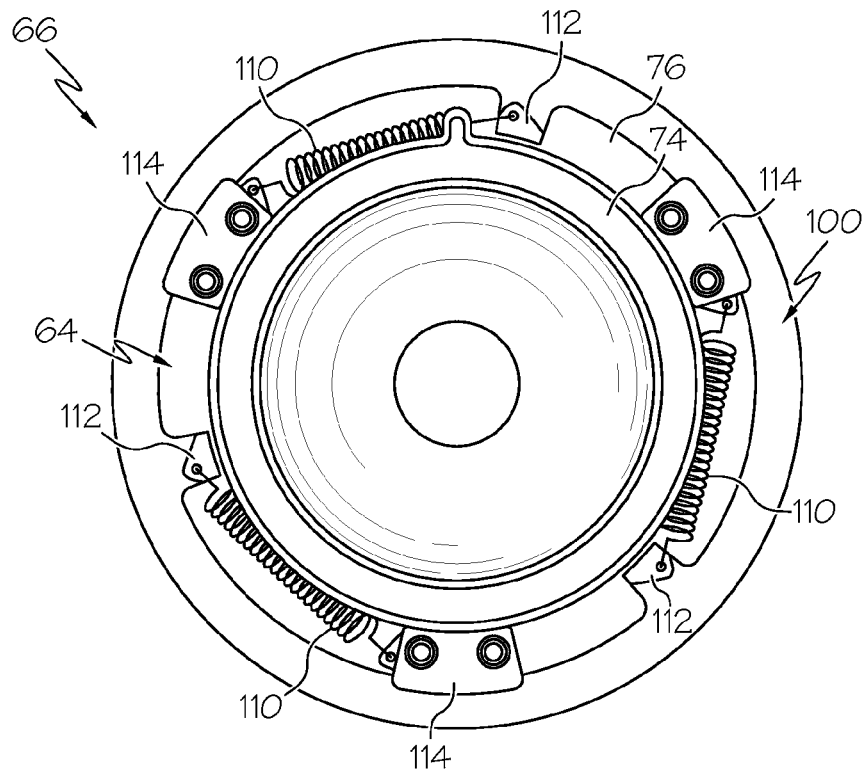
FIG. 7 is a bottom view of the releasable clamp device and first, upper retracting assembly shown in FIG. 6.
Figure 8:
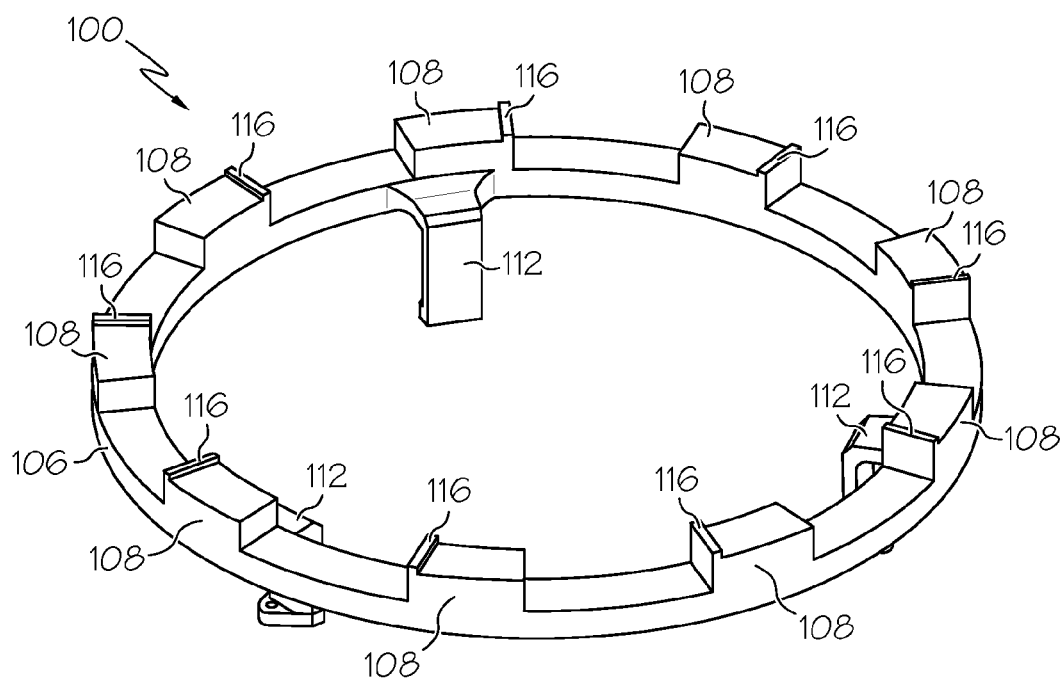
FIG. 8 is an isometric view of a second contrate ring that may be included within the first, upper retracting assembly shown in FIGS. 6 and 7.

First contrate ring 98 of the first, upper retracting assembly 66 is rotationally fixed with respect to sliding clamp member 68. In contrast, second contrate ring 100 is able to rotate relative to sliding clamp member 68 and first contrate ring 98. More specifically, the second contrate ring 100 is able to rotate from the locked position shown in FIG. 5 into an unlocked position shown in FIG. 15 and described more fully below. Second contrate ring 100 is able to slide axially toward first contrate ring 98 of the first, upper retracting assembly. The second contrate ring 100 of the first, upper retracting assembly normally resides in the locked position (FIGS. 3 through 7) and is biased toward the unlocked position by a plurality of extension springs 110 (seen best in FIG. 6). Extension springs 110 are further shown in FIG. 7, which is a bottom view of sliding clamp member 68 and the first, upper retracting assembly 66. As can be seen in FIGS. 6 and 7, extension springs 110 are stretched between a number of hooked axial projections 112, which extend from annular body 106 of second contrate ring 100 in a generally downward direction and away from 76; and a plurality of attachment flanges 114, which are affixed to the underside of cap 76 of sliding clamp member 68. Extension springs 110 exert a torsional bias on second contrate ring 100 urging rotation of second contrate ring 100 toward the unlocked position. Furthermore, due to their angled disposition, extension springs 110 also exert an axial bias on the second contrate ring 100 urging the sliding movement of the second contrate ring 100 toward the first contrate ring 98. This example notwithstanding, second contrate ring 100 can be biased utilizing other means, such as one or more torsion springs or bars, in alternative embodiments. To prevent over-rotation of the second contrate ring 100 in a direction away from the unlocked position (FIG. 15), a hardstop feature may be provided on one or more of teeth 108. For example, as shown in FIG. 8, which illustrates the second contrate ring 100 in isolation, each tooth 108 of second contrate ring 100 may be machined or otherwise fabricated to include a small axial step 116 preventing over-rotation beyond the unlocked position.

Referring again to FIG. 5 and now to FIGS. 9 through 11B, the second, lower retracting assembly 166 (again, the terms "upper" and "lower" utilized in a non-limiting sense as a convenient means of describing the exemplary embodiment illustrated by the accompanying drawings) comprises a second pair of contrate rings 198 and 200. The second pair of contrate rings comprises the first contrate ring 198 and the second contrate ring 200 having interacting toothed surfaces. As illustrated in FIG. 11A, the first contrate ring 198 may be integrally formed with lower mount piece 46 as a single, unitary part. The first contrate ring 198 includes the annular rim 45 from which a plurality of block-shaped teeth 204 extend in an axial direction and toward the second contrate ring 200.

Figure 11A:
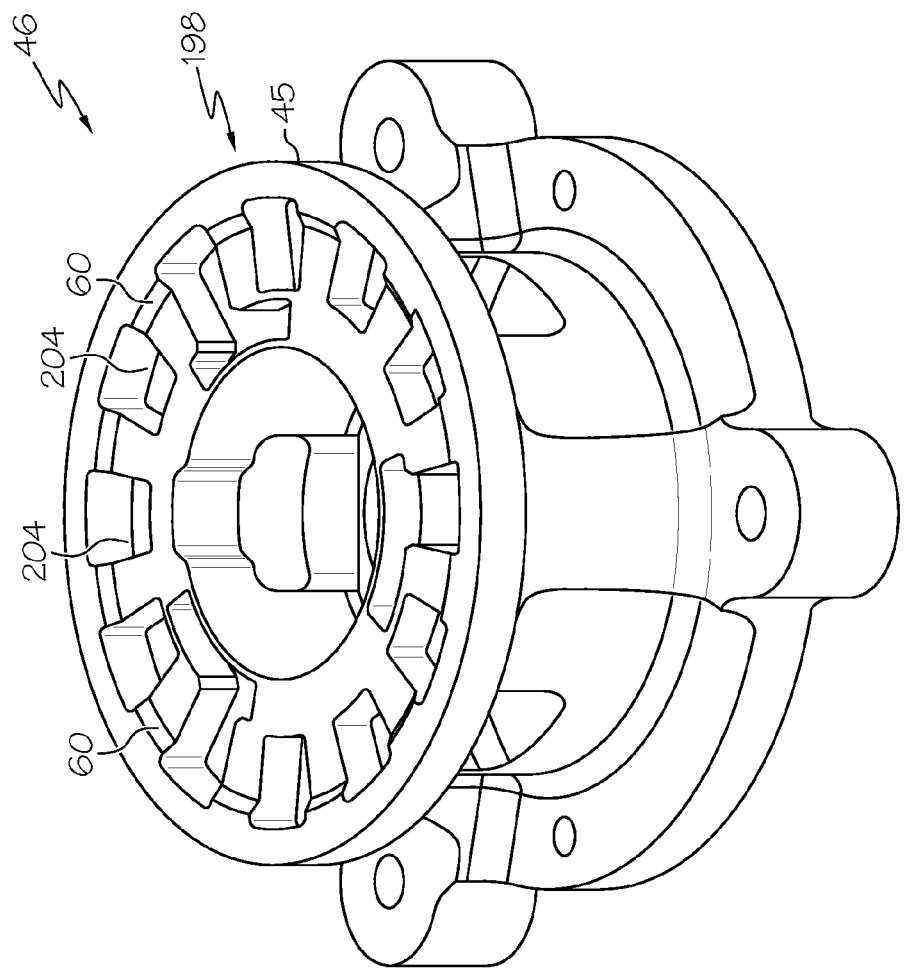
FIGS. 11A and 11B are isometric views, respectively, of a first contrate ring (illustrated as integrally formed with lower mount piece as a single, unitary part) and a second contrate ring that together form the second, lower retracting assembly shown in FIGS. 9 and 10.
Figure 11B:
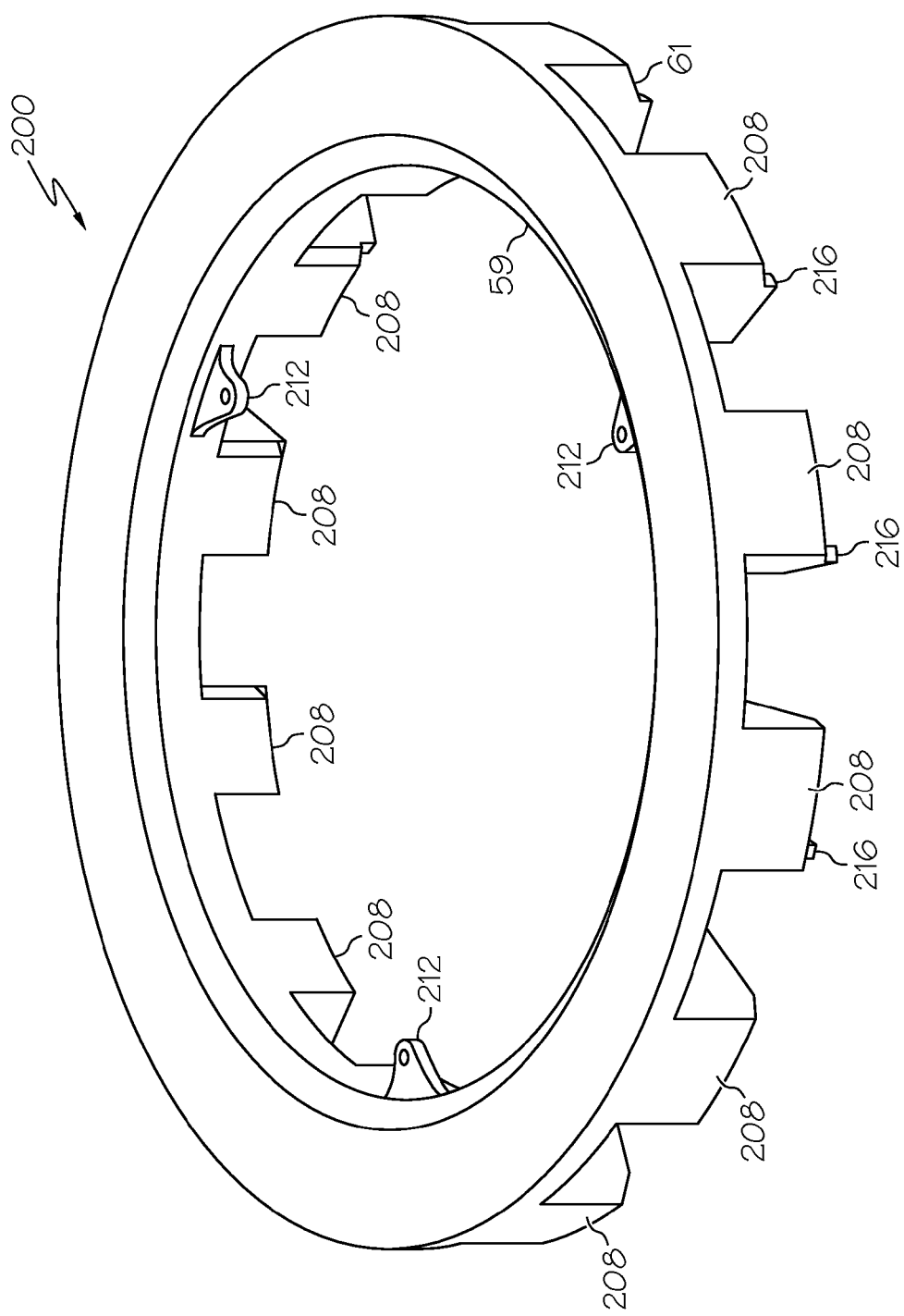
Figure 12:
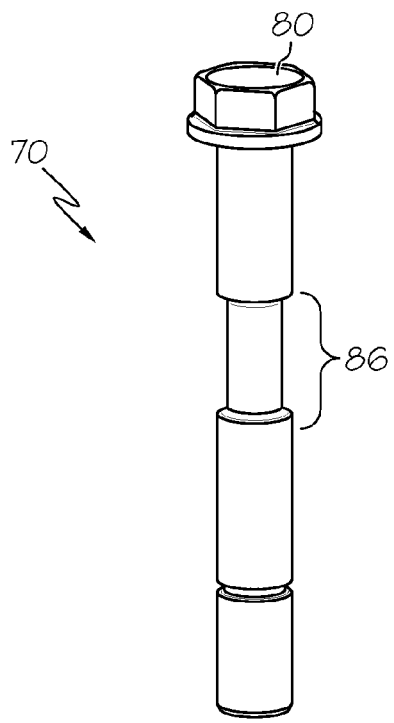
FIG. 12 is an isometric view of an axially-stretchable bolt that may be included within the exemplary launch lock assembly shown in FIGS. 3-5.
Figure 13:
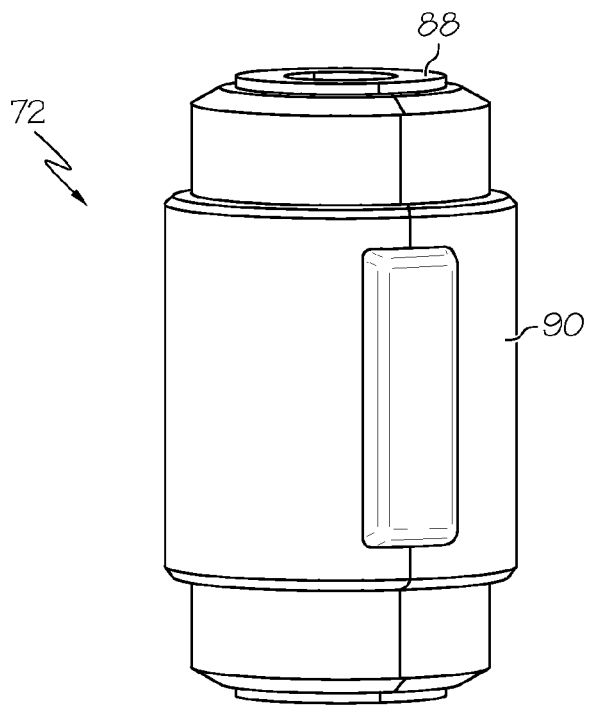
FIG. 13 is an isometric view of a shape memory alloy bolt-stretch actuator that may be included within the exemplary launch lock assembly shown in FIGS. 3-5 and disposed around the axially-stretchable bolt shown in FIG. 12.

Contrate ring 200 may likewise include an annular body 206 from which a plurality of block-shaped teeth 208 extend in an axial direction and toward first contrate ring 198. As best illustrated in FIGS. 5 and 11B (FIG. 11B shows contrate ring 200 in isolation), contrate ring 200 is provided with diagonally opposed chamfered contact surfaces 59 and 61. The diagonally opposed chamfered contact surfaces comprise a first chamfered contact surface 59 and a second chamfered contact surface 61 that are diagonally opposed to each other. The diagonally opposed chamfered surfaces on contrate ring 200 create frustoconical interfaces with mount pieces 44 and 46 to react shear loads when the mount pieces are in clamped engagement and the launch lock assembly is in a locked position. More specifically, first chamfered contact surface 59 is provided around the upper interior edge of contrate ring 200 and provides a frustoconical interface with the upper mount piece 44. Second chamfered contact surface 61 is provided around the lower exterior edge of contrate ring 200 and provides a frustoconical interface with the lower mount piece 46.

Still referring to FIG. 5, a first annular clamp surface (encircled region 84) is provided around the interior of upper mount piece 44. The first annular clamp surface 84 may be defined by the lower contact surface 58 of inner annular protrusion 62 formed within upper mount piece 44 and located opposite the first chamfered contact surface 59 of contrate ring 200. In the locked position shown in FIGS. 3 and 5, the contact surface 58 at the lower end of mount piece 44 engages the first chamfered contact surface 59 of contrate ring 200. Contact surface 60 (FIG. 11A) at the upper end of mount piece 46 engages the second chamfered contact surface 61 of contrate ring 200 to define a second annular clamp surface (encircled region 85). More specifically, upper mount piece 44 includes the inner annular protrusion 62 provided around the interior of lower end portion of upper mount piece 44 and within internal cavity 52. The inner annular protrusion 62 defines the first contact surface 58, which seats on the first chamfered contact surface 59 provided on the second contrate ring 200 when launch lock assembly 42 is in the locked position. The second contact surface 60 is defined by the annular rim 45 provided around and extending axially from the upper end portion of lower mount piece 46 (more specifically, contrate ring 198) toward upper mount piece 44. The second chamfered contact surface 61 provided on the second contrate ring 200 seats on the second contact surface provided on lower mount piece 46 (more specifically, contrate ring 198) when launch lock assembly is in the locked position. Cooperating contact surfaces 58/59 and 60/61 preferably each have a generally annular geometry. In the illustrated example, and as noted above, contact surfaces 59 and 61 are each fabricated to have frustoconical geometries to provide radial alignment and to react shear loads perpendicular to the bolt axis. Due to this structural configuration, convergent axial preload forces are exerted on mount pieces 44 and 46 to maintain cooperating contact surfaces 58 and 59 and cooperating contact surfaces 60 and 61, respectively, in clamped engagement. While the upper inner portion and the lower outer portion of contrate ring 200 are described and illustrated as the diagonally opposed chamfered contact surfaces 59 and 61 on contrate ring 200, it is to be understood that the diagonally opposed chamfered contact surfaces may be on other portions of contrate ring 200 with corresponding adjustments to the geometry of inner annular projection of mount piece 44 and annular rim 45 of mount piece 46.

During assembly of launch lock assembly 42, nut 82 is tightened to a predetermined torque load such that nut 82 exerts an axial preload force on mount piece 46 in the direction of sliding clamp member 68. Also, as a result of the tightening of nut 82, bolt head 80 exerts an axial preload force on sliding clamp member 68 in the direction of lower mount piece 46. This axial preload force is transferred to upper mount piece 44. As hereinafter described, convergent axial preload forces are exerted on mount pieces 44 and 46 to maintain the mount pieces in clamped engagement.

Figure 15:
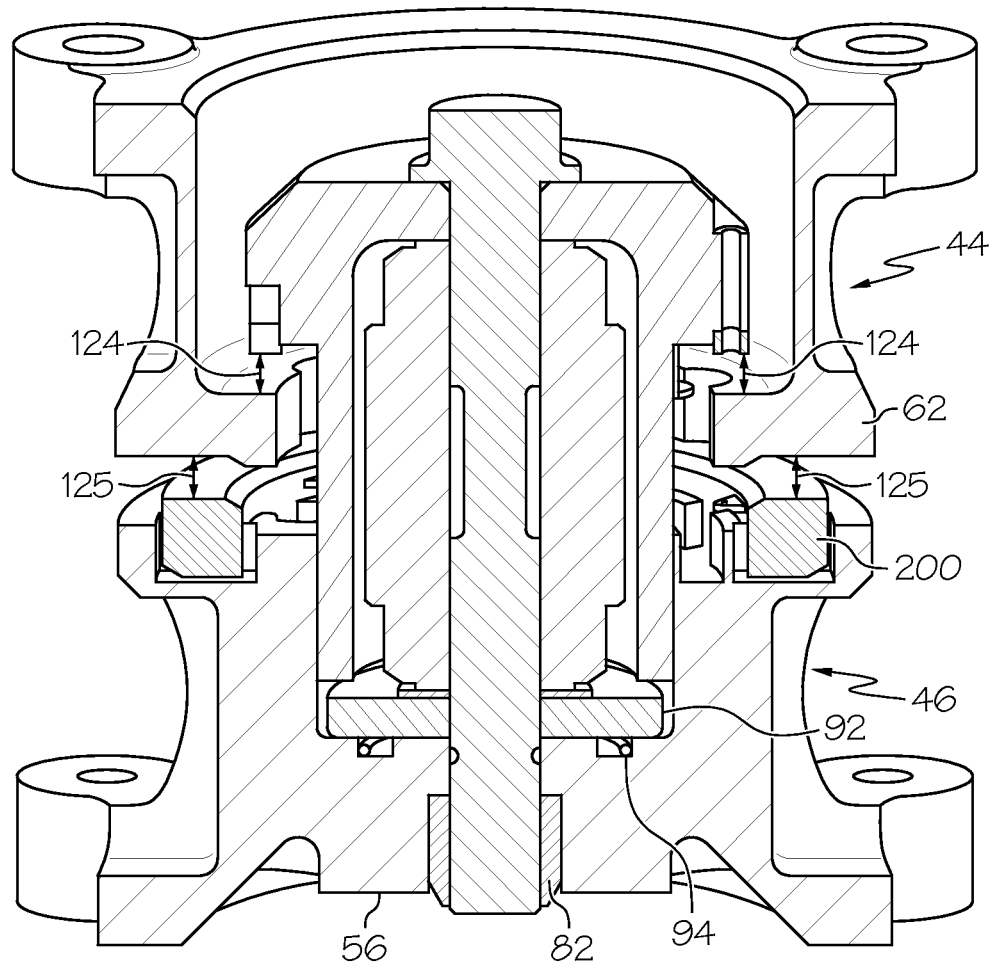
FIG. 15 is a vertical cross-sectional view of the launch lock assembly shown in FIG. 14.

Still referring to FIG. 5, first contrate ring 198 is rotationally fixed with respect to sliding clamp member 68. By contrast, second contrate ring 200 is able to rotate relative to sliding clamp member 68 and the corresponding first contrate ring 198. More specifically, second contrate ring 200 is able to rotate from the locked position shown in FIG. 5 into an unlocked position shown in FIG. 15 and described more fully below. Second contrate ring 200 is able to slide axially toward first contrate ring 198 when moving into the unlocked position (FIG. 15) to allow the second, lower retracting assembly to contract or collapse in a second axial direction and thereby provide axial clearance on the other side of the first mount piece. Second contrate ring 200 normally resides in the locked position (FIG. 5) and is biased toward the unlocked position by a plurality of extension springs 210 (FIG. 9). Extension springs 210 are further shown in FIG. 10, which is a top view of the second, lower retracting assembly 166. As can be seen in FIGS. 9 and 10, extension springs 210 are stretched between a number of hooked axial projections 212, which extend from annular body 206 of second contrate ring 200 in a generally downward direction and toward contrate ring 198. Extension springs 210 exert a torsional bias on second contrate ring 200 urging rotation of the second contrate ring 200 toward the unlocked position (FIG. 15). Furthermore, due to their angled disposition, extension springs 210 also exert an axial bias on the second contrate ring 200 urging the sliding movement of second contrate ring 200 toward first contrate ring 198. This example notwithstanding, second contrate ring 200 can be biased utilizing other means, such as one or more torsion springs or bars, in alternative embodiments. To prevent over-rotation of the second contrate ring 200 in a direction away from the unlocked position (FIG. 13), a hardstop feature may be provided on one or more of teeth 208. For example, as shown in FIG. 11B, which illustrates the second contrate ring 200 in isolation, each tooth 208 of the second contrate ring 200 may be machined or otherwise fabricated to include a small axial step 216 preventing over-rotation beyond the unlocked position. As a result of the above-described configuration, the second contrate ring of each retracting assembly is adapted to rotate and translate in an opposite direction relative to the second contrate ring of the other retracting assembly to define an axial gap on each side of the first mount piece when the releasable clamp device is actuated as hereinafter described.

In the locked position shown in FIG. 5, each of the retracting assemblies 66 and 166 is in the locked position. In the locked position, the teeth of second contrate ring 100 are in tip-to-tip engagement with the teeth of first contrate ring 98 and the teeth of second contrate ring 200 are in tip-to-tip engagement with the teeth of first contrate ring 198 such that both the first and second retracting assemblies reside in an axially expanded position. Although second contrate ring 100 is biased toward the unlocked position by extension springs 110 and second contrate ring 200 is biased toward the unlocked position shown in FIG. 12 by extension springs 210, both contrate rings 100 and 200 are prevented from rotating into the unlocked position by frictional forces or, more specifically, by an axial clamping force exerted on the first, upper retracting assembly in view of its disposition between sliding clamp member 68 and annular clamp surface 84. As noted previously, inner annular protrusion 62 of first mount piece 44 is captured or retained between the second contrate ring 100 of the first retracting assembly and the first frustoconical contact surface 59 of second contrate ring 200 when the launch lock assembly is in the locked position.

Figure 16:
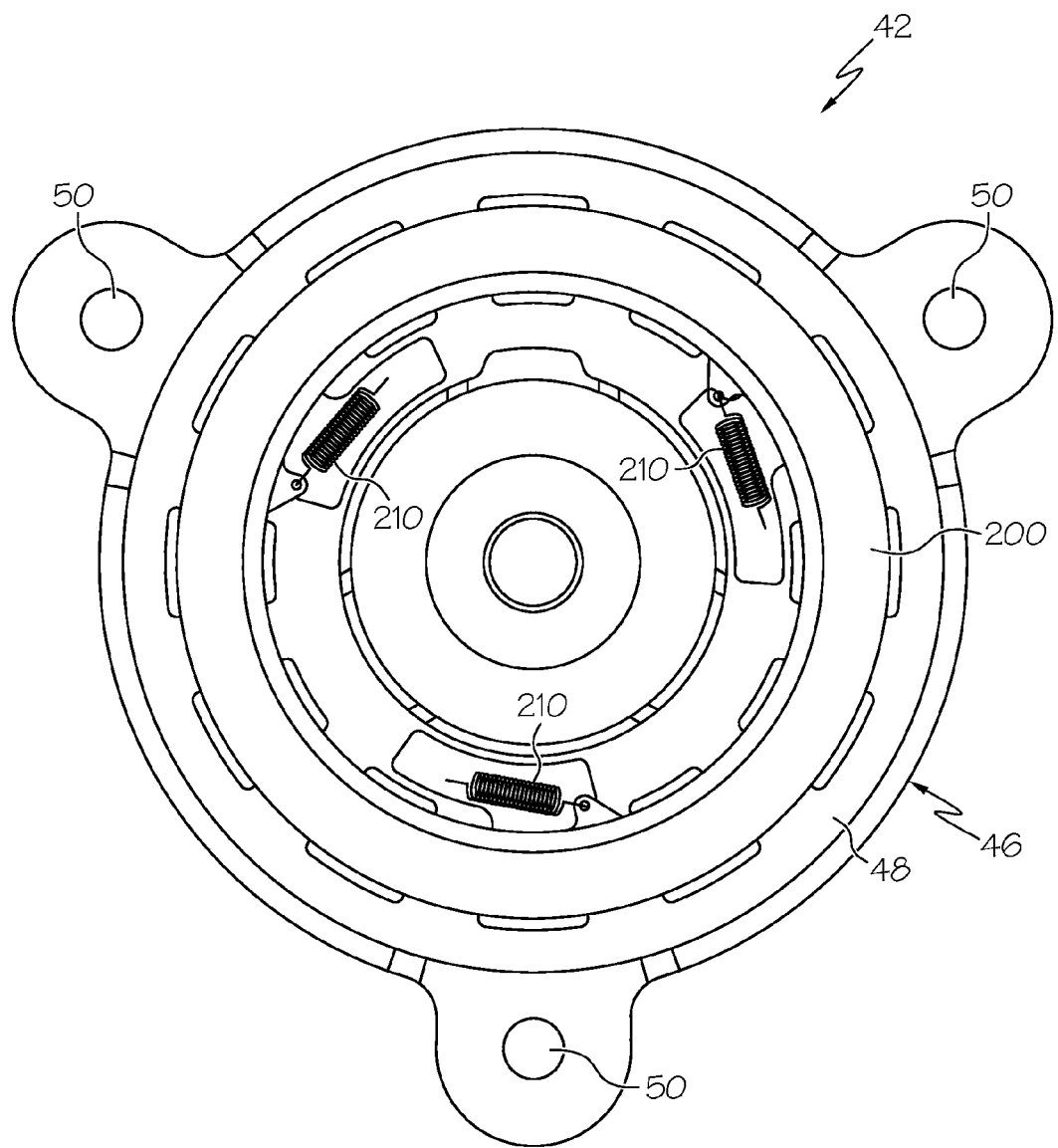
FIG. 16 is a top view of the second, lower retracting assembly included within the launch lock assembly of FIGS. 14 and 15.

At the desired time of deployment, releasable clamp device 64 is actuated in the previously-described manner; that is, bolt-stretch actuator 72 is energized to stretch bolt 70 and allow sliding movement clamp member 68 away from lower mount piece 46 (upward in the illustrated orientation). As indicated above, sliding movement of clamp member 68 is driven by an external bias force as may be provided by an isolator preloaded. Movement of sliding clamp member 68 and, specifically, radially-enlarged cap 76 away from lower mount piece 46 releases mount pieces 44 and 46 from clamped engagement. Also, as sliding clamp member 68 slides axially away from lower mount piece 46, the axial clamping force that previously maintained second contrate rings 100 and 200 in the locked position is removed. Second contrate rings 100 and 200 are thus permitted to rotate and slide axially in opposite directions into the unlocked position shown in FIGS. 14 and 15 under the influence respectively of extension springs 110 and 210 (Extension springs 210 of second, lower retracting assembly 166 are shown in FIG. 16, after actuation of the releasable clamp device 64).

Figure 14:
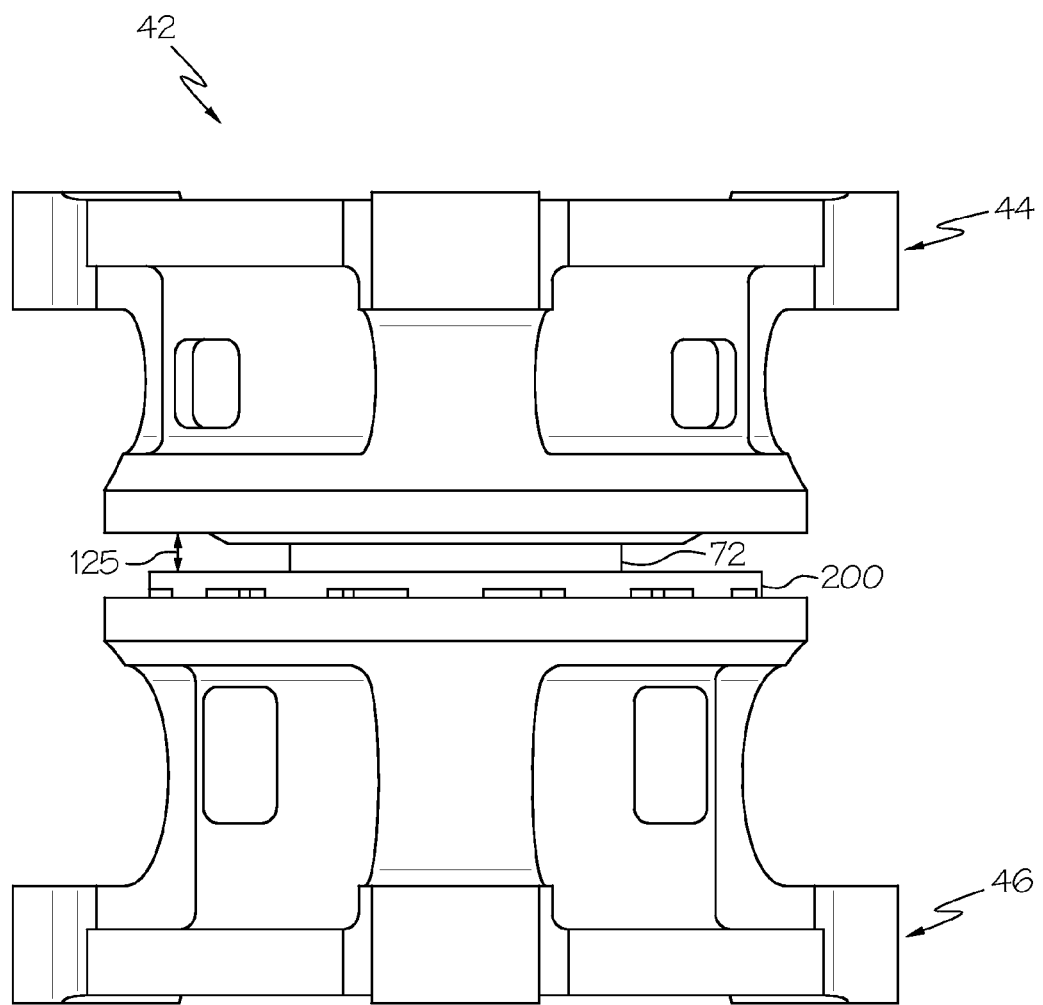
FIG. 14 is a side view of the launch lock assembly shown in FIGS. 3-5 in an unlocked position.

FIGS. 14 and 15 are side and cross-sectional views, respectively, of the launch lock assembly 42 in the unlocked (design) position. In the unlocked position, the teeth of second contrate rings 100 and 200 rotate into an interlocking or meshing position with the teeth of the respective first contrate rings (i.e., the teeth of first contrate ring 98 and second contrate ring 100 rotate into tooth-to-root engagement and the teeth of first contrate ring 198 and second contrate ring 200 rotate into tooth-to-root engagement) such that the first, upper retracting assembly and the second, lower retracting assembly axially contract or collapse and the effective axial height of both the first and second retracting assemblies is reduced. In this manner, the first, upper retracting assembly provides axial clearance in the form of a first axial gap 124 (FIG. 15) between the second contrate ring 100 of the first, upper retracting assembly and the inner annular projection 62 of mount piece 44. Additional axial clearance in the form of a second axial gap 125 (FIGS. 14 and 15) is also provided on the other side of mount piece 44, between inner annular projection 62 of mount piece 44 and the first chamfered contact surface 59 of second contrate ring 200 of the second, lower retracting assembly. Thus, upon actuation of the releasable clamp device, the second contrate ring of each retracting assembly 66 and 166 moves away from the first mount piece 44 creating an axial gap on each side thereof, increasing the available range of axial motion between the first and second mount pieces. It is noted that the position of the upper mount piece 44 remains the same regardless of whether the launch lock assembly is in the locked or unlocked position, thereby substantially eliminating the need to preload the launch lock assembly to any great extent. Although not shown in FIGS. 14-15, launch lock assembly 42 may further be equipped with one or more soft stop features to reduce any shock forces produced by the snap-action of the second contrate rings 100 and 200 when rotating into the unlocked position. It is to be understood that the size of the first axial gap and/or the second axial gap may be adjusted by changing the height of the contrate ring teeth. For example, if the size of one or both of the axial gaps needed to be increased, the contrate ring teeth may be made taller.

From the foregoing, it is to be appreciated that the launch lock assembly according to exemplary embodiments is suitable for usage within a multi-point spacecraft isolation system. The launch lock assembly requires very little or no preload so the size of the axial gap size is not limited by the preload on the launch lock assembly. Therefore, the available range of axial motion between the first and second mount pieces may be increased, thereby providing the system isolators with a greater displacement range over which to operate.

While at least one exemplary embodiment has been presented in the foregoing Detailed Description, it should be appreciated that a vast number of variations exist. It should also be appreciated that the exemplary embodiment or exemplary embodiments are only examples, and are not intended to limit the scope, applicability, or configuration of the invention in any way. Rather, the foregoing Detailed Description will provide those skilled in the art with a convenient road map for implementing an exemplary embodiment of the invention. It being understood that various changes may be made in the function and arrangement of elements described in an exemplary embodiment without departing from the scope of the invention as set-forth in the appended claims.

The invention claimed is:

1. A launch lock assembly, comprising:
   first and second mount pieces;
   a releasable clamp device normally maintaining the first and second mount pieces in clamped engagement; and, when actuated, releasing the first and second mount pieces from clamped engagement;
   a pair of retracting assemblies, each retracting assembly comprising a pair of toothed members having interacting toothed surfaces, wherein one toothed member of each retracting assembly is adapted to move in an opposite direction relative to the other one toothed member of the other retracting assembly to create an axial gap on each side of the first mount piece when the releasable clamp device is actuated, the pair of toothed members respectively comprising a first pair of contrate rings and a second pair of contrate rings, the first and second pair of contrate rings each comprising a first contrate ring and a second contrate ring, wherein the second contrate ring of each of the first and second retracting assemblies comprise the one toothed member;
   at least one spring biasing the respective second contrate ring toward an unlocked position in which the axial gap is created on both sides of the first mount piece, and
   wherein the at least one spring comprises a plurality of springs coupled between the second contrate ring of each retracting assembly and the releasable clamp device, the plurality of springs biasing the second contrate ring in a rotational and axial direction corresponding to the unlocked position.

2. The launch lock assembly according to claim 1, wherein the pair of toothed members comprises a first pair of toothed members and a second pair of toothed members and the pair of retracting assemblies comprises a first retracting assembly comprising the first pair of toothed members and a second retracting assembly comprising the second pair of toothed members, the first and second pair of toothed members respectively comprising the first pair of contrate rings and the second pair of contrate rings.

3. The launch lock assembly according to claim 2, wherein the releasable clamp device relieves a preload on the first and second mount pieces permitting movement of the second contrate ring of each retracting assembly to move in the opposite direction relative to the second contrate ring of the other retracting assembly.

4. The launch lock assembly according to claim 2, wherein the axial gap on each side of the first mount piece comprises a first axial gap between the second contrate ring of the first retracting assembly and the first mount piece and a second axial gap between the first mount piece and the second contrate ring of the second retracting assembly.

5. The launch lock assembly according to claim 2, wherein the first mount piece comprises:
   a generally tubular body having a central opening within which the releasable clamp device and the pair of retracting assemblies are disposed; and
   an inner annular projection extending radially inward from the generally tubular body, wherein the inner annular projection is captured between the second contrate ring of the first retracting assembly and the second contrate ring of the second retracting assembly when the first and second mount pieces are in clamped engagement.

6. The launch lock assembly according to claim 5, wherein the second contrate ring of the second retracting assembly includes a pair of diagonally opposed chamfered contact surfaces, a first chamfered contact surface of the pair of diagonally opposed chamfered contact surfaces engageable with the inner annular projection of the first mount piece and a second chamfered contact surface of the pair engagable with the first contrate ring of the second retracting assembly when the first and second mount pieces are in clamped engagement.

7. A launch lock assembly, comprising:
first and second mount pieces;
a pair of retracting assemblies, each retracting assembly comprising a first contrate ring and a second contrate ring adjacent the first contrate ring, each of the first contrate ring and the second contrate ring including teeth and the second contrate ring of each retracting assembly:
(i) normally residing in an axially-expanded position wherein the teeth of the second contrate ring are in tip-to-tip engagement with the teeth of the first contrate ring of the same retracting assembly, and
(ii) biased toward an axially-collapsed position wherein the teeth of the second contrate ring are in tip-to-root engagement with the teeth of the first contrate ring of the same retracting assembly to decrease the axial length of each respective retracting assembly; and
a releasable clamp device normally maintaining the first and second mount pieces in clamped engagement and, when actuated, releasing the first and second mount pieces from clamped engagement to allow movement of the second contrate ring of each retracting assembly into the axially-collapsed position to form an axial gap on each side of the first mount piece,
wherein the first mount piece comprises:
a generally tubular body having a central opening within which the releasable clamp device and the pair of retracting assemblies are disposed; and
an inner annular projection extending radially inward from the generally tubular body, wherein the inner annular projection is captured between the second contrate ring of the first retracting assembly and the second contrate ring of the second retracting assembly when the first and second mount pieces are in clamped engagement.

8. The launch lock assembly according to claim 7, wherein first and second contrate rings of each retracting assembly each extend around the releasable clamp device.

9. The launch lock assembly according to claim 7, wherein the releasable clamp device comprises:
a sliding clamp member slidably coupled to the second mount piece;
an axially-stretchable bolt extending through the sliding clamp member; and
a bolt-stretch actuator disposed within the sliding clamp member and around the axially-stretchable bolt.

10. The launch lock assembly according to claim 7, wherein the releasable clamp device relieves a preload on the first and second mount pieces permitting movement of the second contrate ring of each retracting assembly to move in an opposite direction relative to the second contrate ring of the other retracting assembly.

11. The launch lock assembly according to claim 7, wherein in each retracting assembly, the second contrate ring rotates relative to the first contrate ring and slides axially toward the first contrate ring when moving into the axially-collapsed position.

12. The launch lock assembly according to claim 7, wherein the axial gap on each side of the first mount piece comprises a first axial gap between the second contrate ring of the first retracting assembly and the first mount piece and a second axial gap between the first mount piece and the second contrate ring of the second retracting assembly.

13. The launch lock assembly according to claim 12, wherein each retracting assembly further comprises at least one spring biasing the respective second contrate ring toward the axially-collapsed position in which the axial gap is formed on each side of the first mount piece.

14. The launch lock assembly according to claim 7, wherein the second contrate ring of the second retracting assembly includes a pair of diagonally opposed chamfered contact surfaces, a first chamfered contact surface of the pair of diagonally opposed chamfered contact surfaces engageable with the inner annular projection of the first mount piece and a second chamfered contact surface of the pair engagable with the first contrate ring of the second retracting assembly when the first and second mount pieces are in clamped engagement.

15. A spacecraft isolation system for deployment between a spacecraft and a payload, the spacecraft isolation system comprising:
a plurality of isolators disposed between the spacecraft and the payload in a multi-point arrangement; and
at least one launch lock assembly coupled between the spacecraft and the payload in parallel with the plurality of isolators, the launch lock assembly comprising:
first and second mount pieces;
a releasable clamp device normally maintaining the first and second mount pieces in clamped engagement and, when actuated, releasing the first and second mount pieces from clamped engagement; and
a pair of retracting assemblies, each retracting assembly comprising a pair of toothed members having interacting toothed surfaces, wherein one toothed member of each retracting assembly is adapted to move in an opposite direction relative to the other one toothed member of the other retracting assembly to define an axial gap on each side of the first mount piece when the releasable clamp device is actuated, the pair of toothed members respectively comprising a first pair of contrate rings and a second pair of contrate rings, the first and second pair of contrate rings each comprising a first contrate ring and a second contrate ring, the second contrate ring of each of the first and second retracting assemblies comprise the one toothed member,
wherein the first mount piece comprises:
a generally tubular body having a central opening within which the releasable clamp device and the pair of retracting assemblies are disposed; and
an inner annular projection extending radially inward from the generally tubular body, wherein the inner annular projection is captured between the second contrate ring of the first retracting assembly and the second contrate ring of the second retracting assembly when the first and second mount pieces are in clamped engagement.

16. The spacecraft isolation system according to claim 15, wherein the second contrate ring of the second retracting assembly includes a pair of diagonally opposed chamfered contact surfaces, a first chamfered contact surface of the pair of diagonally opposed chamfered contact surfaces engageable with the inner annular projection of the first mount piece and a second chamfered contact surface of the pair engagable with the first contrate ring of the second retracting assembly when the first and second mount pieces are in clamped engagement.

* * * * *